United States Patent
Wittmer et al.

(10) Patent No.: US 9,782,703 B2
(45) Date of Patent: Oct. 10, 2017

(54) DEVICE FOR SEPARATING A HETEROGENEOUS MIXTURE OF MATTER AND METHOD FOR CLEANING A FILTER UNIT

(71) Applicants: Stefan Wittmer, Edenkoben (DE); Juergen Linder, Waldsee (DE); Gerhard Welker, Meckesheim (DE); Marcus Wagner, Bad Duerkheim (DE)

(72) Inventors: Stefan Wittmer, Edenkoben (DE); Juergen Linder, Waldsee (DE); Gerhard Welker, Meckesheim (DE); Marcus Wagner, Bad Duerkheim (DE)

(73) Assignee: BASF SE, Ludwigshafen (DE)

( * ) Notice: Subject to any disclaimer, the term of this patent is extended or adjusted under 35 U.S.C. 154(b) by 1083 days.

(21) Appl. No.: 13/630,559

(22) Filed: Sep. 28, 2012

(65) Prior Publication Data

US 2013/0082011 A1  Apr. 4, 2013

Related U.S. Application Data

(60) Provisional application No. 61/541,144, filed on Sep. 30, 2011.

(51) Int. Cl.
*B01D 29/66* (2006.01)
*B01D 29/11* (2006.01)
(Continued)

(52) U.S. Cl.
CPC ............ *B01D 29/66* (2013.01); *B01D 29/114* (2013.01); *B01D 29/52* (2013.01); *B01D 29/78* (2013.01);
(Continued)

(58) Field of Classification Search
None
See application file for complete search history.

(56) References Cited

U.S. PATENT DOCUMENTS

| 662,252 A | * | 11/1900 | Crosscup | ............... B01D 29/54 |
| | | | | 210/333.01 |
| 813,779 A | * | 2/1906 | Cowern | .................. B01D 29/39 |
| | | | | 210/332 |

(Continued)

FOREIGN PATENT DOCUMENTS

| DE | 39 14 326 A1 | 11/1989 |
| DE | 43 26 018 A1 | 2/1994 |

(Continued)

OTHER PUBLICATIONS

International Search Report issued Jan. 7, 2013 in PCT/EP2012/069176 (with English translation of Categories of Cited Documents).

*Primary Examiner* — Robert James Popovics
(74) *Attorney, Agent, or Firm* — Oblon, McClelland, Maier & Neustadt, L.L.P.

(57) ABSTRACT

The invention relates to a device (10) for separating a heterogeneous mixture of matter into at least one retentate and one filtrate, comprising
  a housing (12) which is subdivided into a chamber for the heterogeneous mixture (20) of matter having at least one feed (14) and a filtrate chamber (21) having at least one outlet (16),
  a filter unit (22) which comprises at least one filter element (24), wherein the filter unit (22) is arranged in the chamber for the heterogeneous mixture (20) of matter, and
  a rinsing system (46, 47, 50, 50') for cleaning the filter unit (22),
wherein the rinsing system (46, 47, 50, 50') has at least one rinsing port (46, 47) which is constructed so as to introduce
(Continued)

Figure 1:
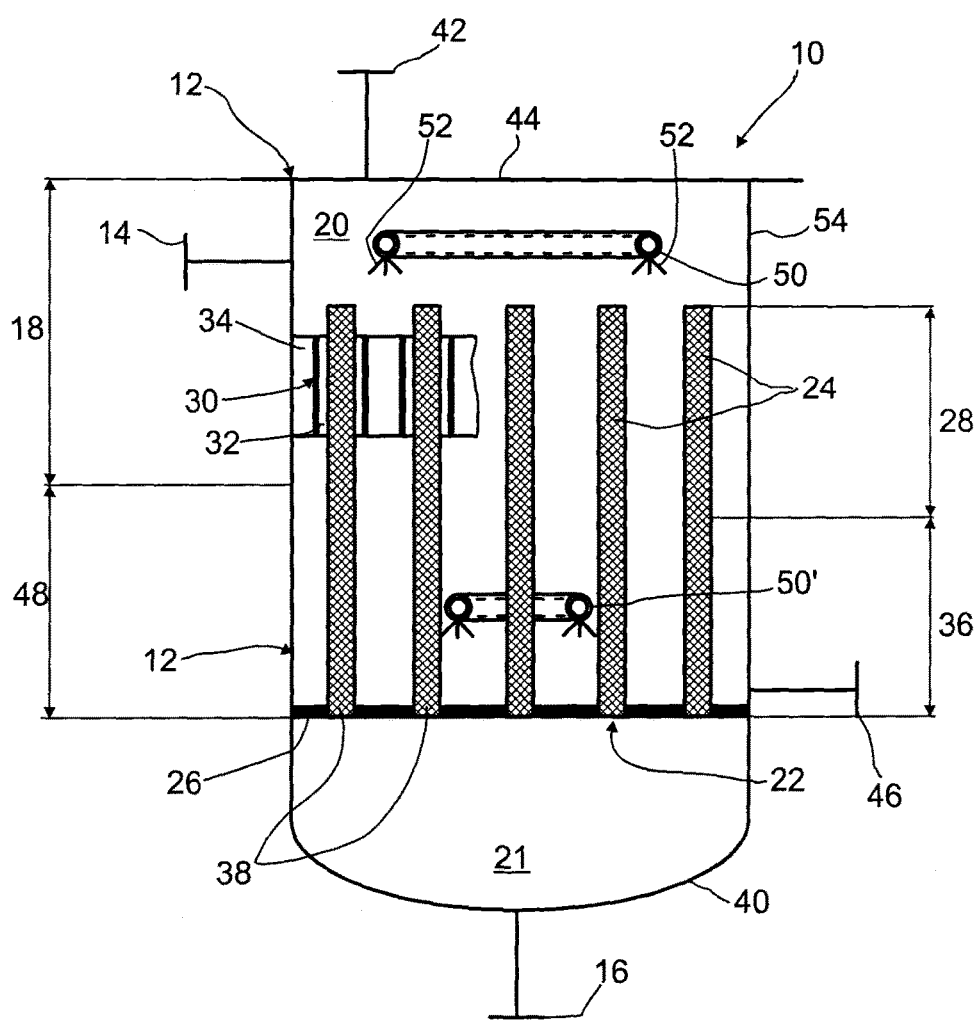

a stream, oriented tangentially to the shell surface (54), of a first washing medium into the chamber for the heterogeneous mixture (20) of matter. The invention further relates to a method for cleaning a filter unit.

1 Claim, 5 Drawing Sheets

(51) Int. Cl.
  *B01D 29/78* (2006.01)
  *B01D 29/90* (2006.01)
  *B01D 29/52* (2006.01)

(52) U.S. Cl.
  CPC .... *B01D 29/908* (2013.01); *B01D 2201/0438* (2013.01)

(56) References Cited

U.S. PATENT DOCUMENTS

| | | | | |
|---|---|---|---|---|
| 2,784,846 A | * | 3/1957 | Ebert | B01D 35/16 210/193 |
| 2,859,874 A | * | 11/1958 | Stearns | F02M 1/00 210/106 |
| 3,306,461 A | * | 2/1967 | Weis | B04C 5/04 209/734 |
| 3,356,215 A | * | 12/1967 | Miles, Jr. | B01D 29/114 210/108 |
| 3,441,143 A | * | 4/1969 | Kudlaty | B01D 29/52 210/333.01 |
| 3,444,077 A | * | 5/1969 | Finch | B01D 17/00 210/265 |
| 3,666,097 A | * | 5/1972 | Ryan | B01D 37/02 210/193 |
| 3,696,933 A | * | 10/1972 | Pall | B01D 29/21 210/444 |
| 3,744,633 A | * | 7/1973 | Schmidt, Jr. | B01D 21/00 210/333.01 |
| 3,913,340 A | * | 10/1975 | Hurley | F25D 3/10 159/6.1 |
| 4,123,356 A | * | 10/1978 | Sugimoto | B01D 29/15 210/107 |
| 4,163,724 A | * | 8/1979 | Muller | B01D 29/114 210/323.2 |
| 4,213,861 A | * | 7/1980 | Muller | B01D 29/114 210/333.01 |
| 4,269,707 A | | 5/1981 | Butterworth et al. | |
| 4,277,349 A | * | 7/1981 | Schwinghammer | B01D 29/114 134/113 |
| 4,278,550 A | * | 7/1981 | Watts | B01D 17/0217 210/104 |
| 4,436,621 A | * | 3/1984 | Picker | B01D 23/00 210/232 |
| 4,446,030 A | * | 5/1984 | Schmidt, Jr. | B01D 29/52 210/120 |
| 4,528,103 A | * | 7/1985 | Spilkin | B01D 29/114 210/313 |
| RE31,966 E | * | 8/1985 | Sillers, Jr. | B01D 46/002 210/232 |
| 4,544,387 A | * | 10/1985 | Agerlid | B01D 29/15 210/416.1 |
| 4,591,446 A | * | 5/1986 | Muller | B01D 29/114 210/323.2 |
| 4,673,499 A | * | 6/1987 | Koch | B01D 17/045 210/295 |
| 4,781,825 A | * | 11/1988 | Grimes | B01D 29/114 210/107 |
| 4,836,936 A | * | 6/1989 | Schewitz | B01D 29/39 210/323.2 |
| 4,997,561 A | * | 3/1991 | Schutz | B01D 29/11 210/232 |
| 5,017,241 A | * | 5/1991 | Ryan | B01D 29/114 134/22.12 |
| 5,114,596 A | * | 5/1992 | Laterra | B01D 29/114 134/22.12 |
| 5,423,977 A | * | 6/1995 | Aoki | B01D 33/073 210/107 |
| 5,437,788 A | * | 8/1995 | Geibel | B01D 29/114 210/323.2 |
| 5,505,842 A | | 4/1996 | Enderle | |
| 5,618,443 A | * | 4/1997 | Engdahl | B01D 29/39 162/30.11 |
| 5,620,596 A | * | 4/1997 | Engdahl | B01D 29/118 210/188 |
| 5,725,764 A | * | 3/1998 | Broussard, Jr. | B01D 17/00 210/221.2 |
| 5,788,746 A | * | 8/1998 | Bartling | B01D 46/0067 55/282 |
| 5,942,111 A | * | 8/1999 | Broussard, Jr. | B01D 17/00 210/221.2 |
| 5,989,419 A | * | 11/1999 | Dudley | B01D 41/04 134/138 |
| 6,004,465 A | * | 12/1999 | Uhr | B01D 29/33 210/195.2 |
| 6,342,158 B1 | * | 1/2002 | Wills | B01D 29/15 210/232 |
| 6,365,054 B1 | * | 4/2002 | Kruger | B01D 29/114 134/22.18 |
| 6,419,842 B1 | * | 7/2002 | Kupka | F26B 7/00 210/325 |
| 6,439,273 B1 | * | 8/2002 | Kruger | B01D 29/114 141/11 |
| 6,475,397 B1 | * | 11/2002 | Sanderson | B01D 29/114 210/407 |
| 6,709,586 B2 | * | 3/2004 | Mason | B01D 29/114 210/237 |
| 7,083,735 B2 | * | 8/2006 | Laing | B01D 29/114 210/391 |
| 7,691,274 B2 | * | 4/2010 | Wnuk | B01D 29/52 210/136 |
| 8,012,359 B2 | * | 9/2011 | Parkinson | B01D 24/008 210/186 |
| 8,057,685 B2 | * | 11/2011 | Laing | B01D 29/055 210/396 |
| 8,309,711 B2 | * | 11/2012 | Wiley | B01D 29/114 210/248 |
| 8,409,429 B2 | * | 4/2013 | Kaske | B01D 29/114 210/104 |
| 8,524,075 B1 | * | 9/2013 | Quintel | B01D 29/232 210/108 |
| 8,647,516 B2 | * | 2/2014 | Love | B01D 33/073 210/408 |
| 8,679,335 B1 | * | 3/2014 | Dufort | B01D 35/02 134/104.4 |
| 8,777,018 B2 | * | 7/2014 | Schmidt | B01D 29/05 210/356 |
| 8,778,174 B2 | * | 7/2014 | Xia | B01D 29/39 210/108 |
| 8,852,445 B2 | * | 10/2014 | Xia | B01D 29/39 210/333.01 |
| 8,951,423 B2 | * | 2/2015 | Schmidt | B01D 29/05 210/356 |
| 9,061,226 B2 | * | 6/2015 | Love | B01D 33/073 |
| 9,358,484 B2 | * | 6/2016 | Tange | B01D 33/11 |
| 9,539,529 B2 | * | 1/2017 | Mullis | B01D 35/02 |
| 9,561,454 B2 | * | 2/2017 | Browning | B01D 29/035 |
| 2012/0037234 A1 | * | 2/2012 | Eckman | B01D 29/035 137/1 |
| 2013/0082011 A1 | * | 4/2013 | Wittmer | B01D 29/66 210/797 |
| 2014/0183110 A1 | * | 7/2014 | Schlichter | B01D 35/12 210/108 |
| 2016/0367917 A1 | * | 12/2016 | Steiner | B01D 29/23 |
| 2017/0051957 A1 | * | 2/2017 | Shimasaki | B01D 17/0217 |

FOREIGN PATENT DOCUMENTS

| | | |
|---|---|---|
| DE | 43 40 218 C1 | 9/1994 |
| DE | 101 36 923 A1 | 2/2002 |

(56) References Cited

FOREIGN PATENT DOCUMENTS

| | | |
|---|---|---|
| DE | 10 2005 018 886 A1 | 11/2006 |
| FR | 2 159 696 A5 | 6/1973 |
| WO | WO 00/10681 A1 | 3/2000 |
| WO | WO 2013/045605 A1 | 4/2013 |

* cited by examiner

DEVICE FOR SEPARATING A HETEROGENEOUS MIXTURE OF MATTER AND METHOD FOR CLEANING A FILTER UNIT

The invention relates to a device for separating a heterogeneous mixture of matter into at least one retentate and at least one filtrate, wherein the device comprises a housing, a filter unit and a rinsing system. The invention further relates to a method for cleaning a filter unit which is provided in such a device.

For separating heterogeneous mixtures of matter, in particular for separating off solids particles from liquids, numerous methods are used. The solid-liquid separation is carried out, for example, by sedimentation, centrifugation, expression or filtration. During filtration, typically, a filter medium is used which separates the heterogeneous mixture of matter when it flows through the filter medium into a retentate and a filtrate. In this case the retentate is retained by the filter medium and accumulates on the filter medium.

The retentate that is collected on the surface of the filter medium forms a filter cake which forms an obstruction to the passage of liquid through the filter medium and reduces the filtering effect. Therefore, the filter medium, on operation of known devices, is typically regenerated by discontinuously or continuously removing the filter cake. A special form of regeneration is cleaning in which the retentates that are retained in a targeted manner or an unwanted manner are removed again.

The cleaning can proceed mechanically by brushes, scrapers or wipers which detach the filter cake from the surface of the filter medium. Such an arrangement is known, for example, from DE 39 14 326 A1. In addition, pressure surges, pulsations, gas purging or rinsing with water or chemicals can be used for removing the filter cake. Other methods for detaching filter cakes from the surface of the filter medium are based on backwashing with filtrate, wherein filtrate is passed through the filter medium in the reverse direction.

DE 10 2005 018 886 A1 discloses a device for separating solids from liquids, which device uses candle filters. The candle filters are constructed as surface-loading filters and are arranged in parallel to one another vertically in a container. In addition, the device provides a gas feed device which frees a stream of gas bubbles, which stream runs along the outer surface of the candle filter or candle filters. The surface of the candle filters is flushed during operation by gas bubbles in order to cause local convection of the liquid in the vicinity of the filter surface and to cause or at least facilitate the falling off or flaking off of filter cake adhering to the surface of the candle filters. In addition, the device comprises filter modules which permit the individual modules to be cleaned by counterflow during operation.

WO 00/10681 A1 describes a backwashable filter arrangement in which a retentate chamber and a filtrate chamber are separated from one another by an intermediate base having boreholes for receiving filter elements. In the retentate chamber there is situated a collecting chamber, the bottom part of which has a port which acts for feeding and suitable distribution of the retentate and for removing the filter residues. The filter candles are cleaned by a cleaning liquid flowing in from the filtrate side into the candle interior. The cleaning liquid is forced in this case through the filter candles from the inside to the outside in the direction opposite to the filtrate direction by a pressurized gaseous medium.

Known facilities for separating a heterogeneous mixture of matter use complex systems in order to clean the filter unit.

It is the object of the present invention to provide a device and method for separating a heterogeneous mixture of matter, using which the cleaning of a filter unit is simplified and at the same time an effective cleaning is achieved. It is a further object of the present invention to design the cleaning of the filter unit economically in consumption of cleaning agents and to be gentle to the filter unit.

These objects are achieved according to the invention by a device for separating a heterogeneous mixture of matter into at least one retentate and one filtrate, comprising
  a housing which is subdivided into a chamber for the heterogeneous mixture of matter having at least one feed and a filtrate chamber having at least one outlet,
  a filter unit which comprises at least one filter element, wherein the filter unit is arranged in the chamber for the heterogeneous mixture of matter, and
  a rinsing system for cleaning the filter unit,
wherein the rinsing system has at least one rinsing port which is constructed so as to introduce a stream, oriented tangentially to the shell surface of the housing, of a first washing medium into the chamber for the heterogeneous mixture of matter.

The device according to the invention permits efficient and rapid cleaning of the filter unit. At the same time the requirement of washing medium for cleaning the filter unit can be kept to a minimum. In addition, gentle cleaning of the filter unit is possible owing to the introduction of a tangentially directed stream with at least one rinsing port.

The device according to the invention can be used for separating a heterogeneous mixture of matter which comprises at least one solids fraction and at least one gaseous and/or liquid fraction. In the device according to the invention, the heterogeneous mixture of matter is separated into the at least one solids fraction as retentate and the at least one gaseous and/or liquid fraction as filtrate. In particular, the heterogeneous mixture of matter can be a suspension which comprises a solids fraction, such as inorganic or organic salts in crystalline form, in a liquid. In the case of a suspension, the solids fraction, for example inorganic or organic salts in crystalline form, is separated off as retentate. In addition, the heterogeneous mixture of matter can comprise filter aids such as pyrophosphate or magnesium silicate which support the filtration physically and mechanically in order in particular to promote the formation of the filter cake in suspensions. The filtrate can comprise, for example, ethoxylates of alcohols, amines, amides and/or acids.

In one embodiment of the device according to the invention, the filter unit is introduced into the housing, wherein the housing comprises a housing base, a housing cover and a shell surface. In this case the shell surface can be designed so as to be cylindrical, wherein the cross section of the shell surface can have a circular, elliptical or polygonal shape. Preference is given to a circular or elliptical cross section.

The housing can be fabricated from varying materials which are adapted to the respective field of use for the device according to the invention. For instance, for applications in which a liquid mixture of matter is filtered, corrosion- and acid-resistant materials such as steel, in particular nonrusting stainless steel, titanium, nickel-molybdenum alloys, or plastics, in particular fiber-reinforced plastics are suitable.

The housing comprises in addition at least one feed and at least one outlet which can be designed, for example, as a flange joint. Through the at least one feed, the heterogeneous mixture of matter is introduced into the housing. After the mixture has flowed through the filter unit provided in the housing, the filtrate is passed out of the housing through the at least one outlet. In order to divide the interior of the housing into a chamber for the heterogeneous mixture of matter and a filtrate chamber, the filter unit is arranged within the housing between the feed and the outlet. The filter unit in this case can comprise a filter base on which the at least one filter element is mounted in such a manner that this projects into the chamber for the heterogeneous mixture of matter and separates the chamber for the heterogeneous mixture of matter from the filtrate chamber.

The filter unit can comprise at least one filter element which is equipped with a filter medium. The filter element can be constructed as a surface-loading filter or depth-loading filter, wherein the filter medium is selected in such a manner that when the heterogeneous mixture of matter flows through it, the at least one retentate, in particular the solids fraction, accumulates thereon. The filtering effect of the filter element in this case is critically determined by the pore size of the filter medium. Depending on the field of use, filter media of the most varied materials can be used, for example plastics, ceramics and/or metals. Particularly suitable filter media are porous solids such as sintered metals, or fibrous fabrics made of textiles such as felts or nonwovens, plastics fibers made of polyester, polyphenylene sulfide or polytetrafluoroethylene, ceramic fibers, mineral fibers or glass fibers. In order to bring filter media made of fibrous fabrics into the desired shape, typically a support is used which supports the fibrous fabric.

In particular, the at least one filter element can be constructed as a filter candle which typically has a cylindrical shape having a circular, elliptical or polygonal base and a length of more than 0.1 m, preferably 0.5 m to 2 m. In this case the shell surface of the filter candle separates an internal volume of the filter candle from the surroundings and is at least in part equipped with a filter medium. In this manner the heterogeneous mixture of matter can flow through the filter medium of the filter candle from the surroundings toward the interior, wherein the retentate accumulates on the shell surface and the filtrate occurs in the internal volume of the filter candle. In order to be able to pass out the filtrate, customarily at least one end of the filter candle is constructed so as to be open.

A typical embodiment of filter candles is wound candles, which comprise wound fibers or wound sheets of synthetic or natural material. Other filter candles can be produced from ceramics or metal, for example from sintered metal or multilayer metal cloths. In addition, there are filter candles having exchangeable filter media, for example stretchable filter candles, in which filter media of textile origin are generally stretched on a support.

In one embodiment, the filter unit comprises at least one filter element, in particular at least one filter candle, which is arranged substantially vertically within the housing, in particular in the chamber for the heterogeneous mixture of matter, and the surface of which serves at least in part as filter surface. Substantially vertically, in the present context, comprises an inclination of the at least one filter element in the range ±15° from the vertical. The at least one filter element, in particular the at least one filter candle, is preferably mounted on the filter base which comprises, for example, a number of openings corresponding to the number of filter elements. The at least one filter element, in particular constructed as a filter candle, thereby extends from the filter base into the chamber for the heterogeneous mixture of matter, wherein the internal volume of the filter elements is connected to the filtrate chamber by openings in the filter base.

In the event that the filter unit comprises a plurality of filter elements, the arrangement of the filter elements can be selected as desired, wherein an efficient utilization of space plays a major role. In particular for housings having a cylindrical shell surface which have a circular or elliptical cross section, the filter elements can be ring-shaped, star-shaped, or arranged in parallel rows. Preference is given to an arrangement having spacings between the filter candles which are as uniform as possible. Spacings that are as uniform as possible is taken to mean that deviations of the spacing between the filter candles do not exceed ¼, preferably ⅛, and particularly preferably 1/16, of a mean spacing, wherein the mean spacing is given by the sum of the spacings divided by the number of the spacings. Particularly uniform spacings between the filter candles can be achieved by an arrangement in a honeycomb structure. In this case the individual filter candles are evenly distributed on three non-adjacent corners of the hexagons of the honeycomb structure.

Between the feed- and outlet-side surface of the at least one filter candle, there is typically provided a pressure difference of 0.1 to 3 bar, in order to support the flow of the heterogeneous mixture of matter through the filter medium. In this case, in the chamber for the heterogeneous mixture of matter, a higher pressure prevails than in the filtrate chamber.

In order to free the filter elements from the accumulated retentate, preferably a solids fraction of the heterogeneous mixture of matter, and to restore the filtering effect, the device proposed according to the invention provides a rinsing system. The rinsing system comprises at least one rinsing port, wherein the rinsing port, in one embodiment, is arranged tangentially to the shell surface of the housing in order to introduce a first washing medium into the chamber for the heterogeneous mixture of matter. In an alternative embodiment, the at least one rinsing port is arranged at any desired angle to the shell surface of the housing and comprises means for deflecting the stream of the first washing medium. The angle between rinsing port and shell surface of the housing is in this case between the tangential and orthogonal directions of the at least one rinsing port. Preferably, the rinsing port is arranged substantially orthogonally to the shell surface of the housing, wherein substantially orthogonally comprises deviations of +/−15° from the orthogonal.

The deflection means can be constructed, for example, as a tubular elongation of the rinsing port in the chamber for the heterogeneous mixture of matter. The at least one rinsing port can, in addition, be arranged in a shell section of the housing which encloses the chamber for the heterogeneous mixture of matter.

The at least one rinsing port can therefore provide a stream of the first washing medium which is directed along the tangent which contacts the shell surface of the housing at the site of the at least one rinsing port. The at least one rinsing port therefore opens out into the chamber for the heterogeneous mixture of matter and there, owing to the tangentially directed stream of the first washing medium, generates a circular flow which makes the discharge of the retentate and thus the rinsing process more efficient. In order to support further the circular flow, in addition to the tangential flow direction of the at least one rinsing port, the housing can be constructed to be of cylindrical shape having circular or elliptical base.

As first washing medium, depending on the field of application, water, for example demineralized water, or a solvent such as methanol can be used. In particular, a first washing medium can be selected in which the retentate dissolves. Thus, for example organic or inorganic salt-containing retentates dissolve in water. In this case, the introduction of the first washing medium with a tangential direction of flow and the resultant circular flow additionally favor the dissolution of retentates in the first washing medium.

The at least one rinsing port is preferably arranged on the shell surface of the housing in such a manner that the washing medium is introduced on the filter base into the region for the heterogeneous mixture of matter. For this purpose, the at least one rinsing port can be arranged on the housing in a lower region of the shell section which encloses the chamber for the heterogeneous mixture of matter. The lower region of the shell section which encloses the chamber for the heterogeneous mixture of matter is in this case below half the height of this shell section, preferably below a quarter of the height of this shell section, and particularly preferably below an eighth of the height of this shell section. In one embodiment, the at least one rinsing port is placed such that the lower edge thereof is at the same level as the filter base. The introduction of a first washing medium in the lower region is particularly advantageous in the case of a vertical arrangement of the filter elements, since the retentate in this arrangement preferably accumulates in the lower region of the chamber for the heterogeneous mixture of matter, in particular on the filter base.

For the rinsing system, a plurality of rinsing ports can be arranged in regular and/or irregular spacings on the shell surface of the housing. Preference is given to a regular arrangement of rinsing ports. In this case the spacing between two rinsing ports on the circumference of the shell surface can be less than half, preferably less than one third, and particularly preferably less than one quarter, of the circumference of the shell surface. As rinsing ports, differing rinsing nozzles can be used, from which a first washing medium exits at a pressure of 0.1 bar to 10 bar, preferably from 2 to 7 bar, and particularly preferably from 3 to 5. As rinsing nozzles, flat spray nozzles or solid-stream nozzles can be used, with which a volumetric flow rate of 0.5 to 30 $m^3/h$ can be supplied, preferably from 0.5 to 10 m3/h.

Additionally to or alternatively to the at least one rinsing port, the rinsing system can comprise at least one spray nozzle which is situated within the housing in the chamber for the heterogeneous mixture of matter in order to spray the at least one filter element with a second washing medium. The at least one spray nozzle generates in this case a pressure at which the second scrubbing medium exits. For this purpose, spray nozzles can be used which deliver the washing medium at a pressure of 0.1 to 10 bar, preferably from 2 to 7 bar, and particularly preferably from 3 to 5 bar. For generating a spray jet, the at least one spray nozzle can be constructed as a flat-spray nozzle, spray ball nozzle, hollow-cone spray nozzle, full-cone nozzle, tank-cleaning nozzle and/or rotary nozzle, with which a volumetric flow rate of 0.5 to 30 $m^3/h$, preferably from 0.5 to 10 $m^3/h$, can be introduced. Thus from the at least one spray nozzle a washing medium jet is provided by means of which the surface of the at least one filter element is freed from accumulated retentate. An additional cleaning effect can be achieved by using the placing of the at least one spray nozzle in a controlled manner.

Preferably, the second washing medium corresponds to the first washing medium. The first and second washing media, however, can also be selected to be different. For example, the first washing medium can be selected in such a manner that the retentate dissolves therein. The second washing medium, in contrast, can comprise a chemical solution which supports the detachment of retentate from the filter elements.

In addition, the at least one spray nozzle can be mounted so as to be fixed or pivotable. Also, the at least one spray nozzle can be provided at different sites in the chamber for the heterogeneous mixture of matter. For example, the at least one spray nozzle can be mounted on the housing, in particular the shell surface, or the housing cover. Additionally, or alternatively, the at least one spray nozzle can be placed between a plurality of filter elements and/or above at least one filter element. Further additionally or alternatively, the at least one spray nozzle can be arranged on a holding system, as will be described in more detail hereinafter. In this case the at least one spray nozzle can be fastened by further fastening means to the housing or to the filter unit itself.

Preferably, a plurality of spray nozzles can be arranged on at least one spray ring or at least one spray arm which is situated in the region for the heterogeneous mixture of matter, in order to spray the at least one filter element with the second washing medium. In one embodiment of the spray ring or the spray arm, spray nozzles can be provided which are constructed as a flat-spray nozzle, spray ball nozzle, hollow-cone spray nozzle, full-cone nozzle, tank-cleaning nozzle and/or rotary nozzle. In another embodiment, the spray ring or the spray arm can also be a tube provided with spraying openings.

The at least one spray ring or the at least one spray arm can be placed between a plurality of filter elements and/or above at least one filter element. In particular, a plurality of spray rings or spray arms can be provided at different sites in the chamber for the heterogeneous mixture of matter. If a plurality of spray rings or spray arms are used, they can have a differing number of spray nozzles and differing diameter or length. Also, the shape of the spray ring can adopt any desired shape and, in particular, be adapted to the arrangement of the filter elements. For example, in the case of a circular arrangement of the filter elements, a circular shape of the spray ring can be advantageous. Similarly, for the arrangement of the filter candles in a honeycomb structure, a hexagonal shape of the spray ring can be advantageous.

In a preferred embodiment, at least two spray rings, at least two spray arms or a combination thereof are provided, wherein at least one of the spray rings or at least one of the spray arms is situated above the filter unit and at least one further spray ring or at least one further spray arm is arranged within the filter unit, in particular between the filter elements. In this case the at least one spray ring above the filter unit preferably has a larger diameter than the at least one further spray ring within the filter unit. A corresponding arrangement can also be realized using spray arms running in a free space between filter elements of the filter unit.

In one embodiment having at least two spray rings, the diameter of the at least one spray ring above the filter unit corresponds to at most the maximum extension of the filter unit. Preferably, the diameter is between half and three quarters of the maximum extension of the filter unit. In this manner, the at least one spray ring above the filter unit can achieve a cleaning effect over the whole length of the filter elements. In addition, the at least one further spray ring within the filter unit can achieve a cleaning effect between the filter elements or further reinforce the cleaning effect of the at least one spray ring above the filter unit.

The retentate that is eroded by the rinsing system can be removed from the chamber for the heterogeneous mixture of matter through a separate outlet as wastewater. In the case of retentates that are soluble in the washing medium, the outlet can be used for the filtrate in the filtrate chamber for the discharge of the eroded retentate. In one embodiment, the rinsing system can be operated in time intervals for the cleaning of the filter. Thus, the rinsing system can be operated after separation of one or more batches of heterogeneous mixture of matter in order to erode the filter cake which has accumulated on the filter elements during the separation of the heterogeneous mixture of matter.

It has further proved to be advantageous to fix the filter unit within the chamber for the heterogeneous mixture of matter using at least one holding system. This is because, in particular in the case of vertically arranged filter elements, the length of the filter elements can influence the stability. Therefore, the device according to the invention provides at least one holding system which fixes the filter unit within the chamber for the heterogeneous mixture of matter. In this case the design of the holding system depends on the filter length and on the properties of the filter base as support unit. In addition, a plurality of holding systems can be provided at different heights along the filter.

Preferably, the holding system is constructed in such a manner that the at least one filter element is fixed to the filter unit. For this purpose, the holding system can fix the at least one filter element in an upper region. In this case the upper region of the at least one filter element designates a region which extends at the end of the filter element which is opposite the filter base. The upper region of the filter element extends by a maximum of up to the half of the filter element. Preferably, the at least one holding system is provided in an upper quarter, particularly preferably in an upper eighth, of the at least one filter element. In addition, the at least one holding system, for fastening of same, can be connected to the housing, in particular the shell surface.

In a preferred embodiment, the at least one holding system is constructed as an open holding system. An open holding system permits, especially in the combination with a rinsing system, as described above, the sprayed washing medium to be able to reach the filter elements from any position in the chamber for the heterogeneous mixture of matter.

The open holding system can comprise at least one sleeve which at least in part encloses the at least one filter element. In this case the number of sleeves preferably corresponds to the number of filter elements. For instance, one sleeve can enclose in each case one filter element. In this case a plurality of sleeves can enclose the respective filter elements at the same or different heights. By means of the sleeves, point contact between the filter elements and the holding system is avoided and a planar support is achieved. This spares the filter elements and increases the service life thereof. In addition, the extent of the sleeve along the filter elements can be kept as small as possible in order not to decrease the usable filter area. For this purpose, the sleeve can also be constructed in such a manner that the sleeve encloses the filter element only partially at the periphery. Preferably, however, the sleeve does not enclose more than half of the periphery of the filter element.

In addition to the at least one sleeve, the at least one holding system can comprise at least one web, wherein one or more webs connect at least one sleeve to the housing and/or one or more webs connect at least two sleeves to one another. Also, one web can connect a sleeve to another web. The webs can connect, for example, the at least one sleeve to the housing. In the case of a plurality of sleeves, one or more webs can connect the sleeves to one another. Additionally or alternatively, one or more webs can connect the system of a plurality of sleeves to the housing. This enables an open structure for the holding system, so that washing medium sprayed by the rinsing system can reach the filter elements.

In one embodiment, the at least one spray nozzle of the rinsing system is arranged on the holding system. Thus, at least one spray nozzle can be mounted on the sleeves or webs of the holding system. This design is particularly simple, since further means for holding the at least one spray nozzle are superfluous.

In addition, the abovementioned objects are achieved according to the invention by a method for cleaning a filter unit which is provided in a housing and separates a chamber for a heterogeneous mixture of matter from a filtrate chamber, wherein a first washing medium is introduced into the chamber for the heterogeneous mixture of matter using at least one rinsing port arranged tangentially on the shell surface of the housing.

The method according to the invention preferably serves for cleaning a filter unit having at least one filter element which is part of the above described device. By means of the introduction of a first washing medium by means of at least one rinsing port which is orientated tangentially on the housing, a circular flow is generated which makes the discharge of the retentate and thus the rinsing process more efficient. In order to support further the circular flow, in addition to the tangential orientation of the at least one rinsing port, the housing can comprise a cylindrical shell surface having a circular or elliptical cross section. Preferably, the at least one rinsing port introduces the first washing medium onto a filter base in the chamber for the heterogeneous mixture of matter, in order to generate a circular flow of the first washing medium.

Additionally, or alternatively to introducing a first washing medium via at least one rinsing port, the filter unit can be sprayed with a second washing medium via at least one spray nozzle which is situated in the chamber for the heterogeneous mixture of matter. In this case the spray nozzles are constructed in such a manner that a mechanical cleaning effect is achieved and the cleaning of the filter unit is optionally further promoted. In particular, the cleaning effect of the at least one spray nozzle can be controlled by the placing in the chamber for the heterogeneous mixture of matter. In particular, the filter unit can be sprayed with a second washing medium via at least one spray nozzle which is arranged on at least one spray ring.

The at least one spray nozzle preferably generates a jet of the second washing medium which exits under pressure from the spray nozzle. For this purpose, spray nozzles can be used which deliver the washing medium at a pressure of greater than 0.1 bar, preferably from 2 to 7 bar, and particularly preferably from 3 to 5 bar. For generating a spray jet, the at least one spray nozzle can be constructed as a flat-spray nozzle, spray ball nozzle, hollow-cone spray nozzle, full-cone nozzle, tank-cleaning nozzle and/or rotary nozzle, with which a volumetric flow rate of 0.5 to 30 $m^3/h$, preferably from 0.5 to 10 $m^3/h$, can be fed. Thus, from the at least one spray nozzle, a washing medium jet can be provided via which the surface of the at least one filter element can be freed from accumulated retentate.

As first or second washing medium, depending on the field of application, water, in particular demineralized water, or solvent, such as methanol, can be used. In particular, the first washing medium can be selected in such a manner that the retentate dissolves in the first washing medium. For instance, retentates such as most salts, for example, dissolve in water. In this case the introduction of the first washing medium using at least one rinsing port arranged tangentially on the housing and the resultant circular flow additionally promotes the dissolution of retentates in the first washing medium. The second washing medium serves decisively for the mechanical cleaning via the at least one spray nozzle, wherein the aspect of the solubility of the retentate in the second washing medium plays a minor role. The second washing medium can therefore differ from the first washing medium. In order to save additional expenditure, it is usually expedient to use one washing medium for the entire rinsing system, that is to say for the at least rinsing port and for the at least one rinsing nozzle.

The rinsing system can, in addition, be operated in such a manner that the at least one rinsing port and the at least one spray nozzle are used simultaneously and/or sequentially for cleaning the filter unit, in particular the at least one filter element. For example, it can be advantageous to clean the filter unit, in particular the at least one filter element, first with the at least one spray nozzle, in order to detach accumulated retentates. Then, by using the at least one rinsing port, the detached retentate can be dissolved in the washing medium and discharged.

The invention will be described in more detail hereinafter with reference to drawings.

Figure 2:
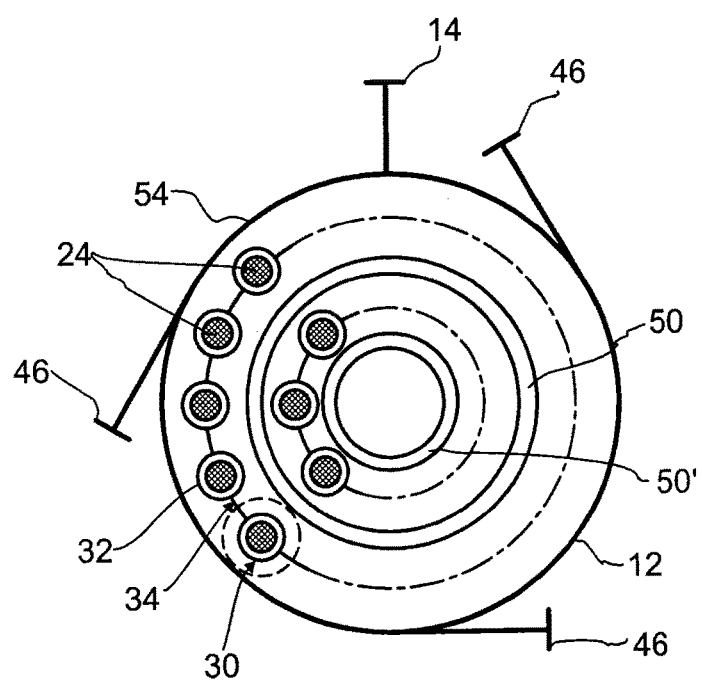
Figure 3:
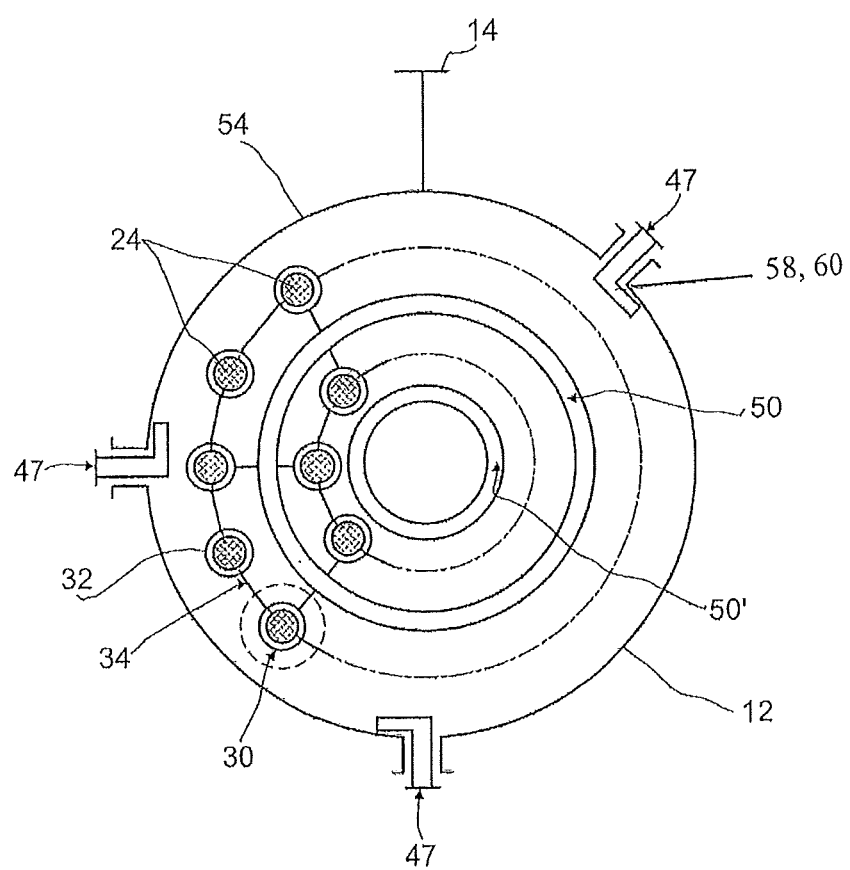
Figure 4:
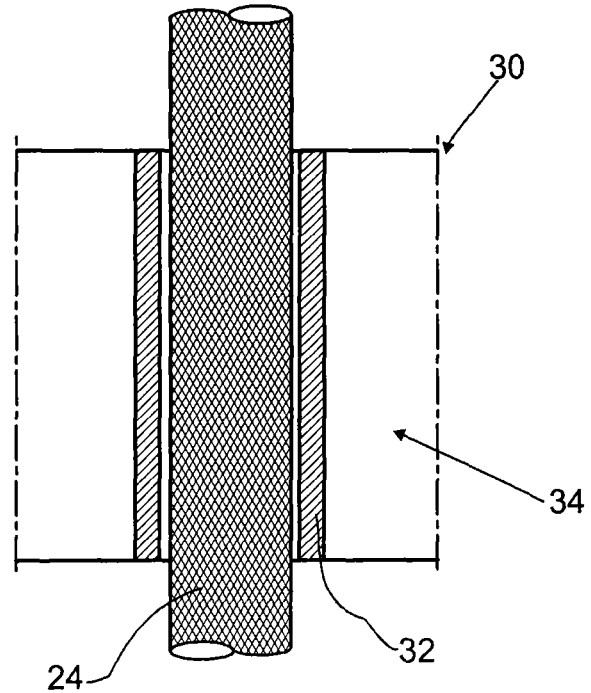
Figure 5:
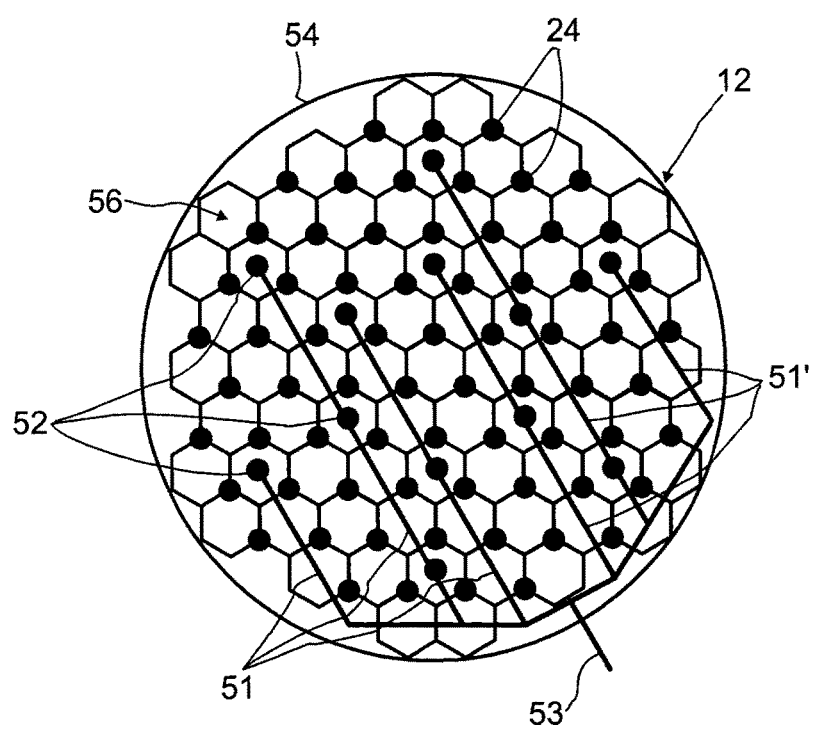

In the drawings:

FIG. 1 shows a schematic representation of a device according to the invention for separating a heterogeneous mixture of matter in side view, FIG. 2 shows a schematic representation of the device according to the invention according to FIG. 1 in plan view including spray rings, FIG. 3 shows a further embodiment of the rinsing port according to FIG. 2, and FIG. 4 shows a detail view of the holding system in side view, FIG. 5 shows a schematic representation of the device according to the invention as shown FIG. 1 in plan view including spray arms.

FIG. 1 shows in diagrammatic representation a sectional view of the device 10 according to the invention. The device 10 according to the invention is not restricted to a field of application and can be used with any desired heterogeneous mixtures of matter which comprise a solids fraction and a liquid fraction. For example, the device 10 according to the invention can be used for preparing process water in the chemical and mechanical industries.

The device 10 according to the invention comprises a housing 12 having a substantially cylindrical shell surface and also a feed 14 and an outlet 16. The housing 12 is further subdivided into a chamber for the heterogeneous mixture of matter chamber 20 and a filtrate chamber 21. The feed 14 is situated in the upper region 18 of the housing 12, wherein a heterogeneous mixture of matter is introduced into the chamber for the heterogeneous mixture 20 of matter via the feed 14.

In the housing 12 a filter unit 22 is introduced which comprises a plurality of filter candles 24 on a filter base 26. The filter candles 24 are typically constructed as cylindrical filter elements, wherein a filter medium, such as a fabric made of plastics, ceramics and/or metal, can be wound or stretched layerwise on a support. In the lower region 36, the filter candles 24 are mounted on a filter base 26 which has, for example, a number of holes 38 corresponding to the number of the filter candles 24. These form the outlet of the filter candles 24, the filtering effect of which consequently occurs in the event of flowthrough from the outside, that is to say the chamber for the heterogeneous mixture of matter, toward the inside.

Owing to the longitudinal extension of the filter candles 24 and the vertical arrangement thereof in the housing 12, in addition, in the upper region 28 of the filter candles 24, a holding system 30 is provided which fixes the filter candles 24 within the housing 12. In the upper region 28, the filter candles 24 are held by a system of sleeves 32 which enclose the individual filter candles 24. The sleeves 32 are, as is shown in FIG. 2, connected to one another by webs 34 and to the housing 12.

If a heterogeneous mixture of matter which can be, for example, a suspension, flows through the filter candles 24, this heterogeneous mixture of matter is substantially separated into a solids fraction as retentate and a liquid fraction as filtrate. In this case the solids fraction, for example an undissolved salt, arises as filter cake outside the filter candles 24 and the liquid fraction is passed as filtrate into the interior of the filter candles 24. Via the outlet 16 on the housing base 40, the filtrate is passed out of the device 10. In addition, a venting opening 42 is provided on the housing cover 44 in order to adjust appropriately the pressure difference between feed- and outlet-side surfaces of the filter candles 24.

During filtration, the retentate accumulates on the surface of the filter candles 20 as filter cake and reduces the filtering efficiency. For regeneration of the filter candles 24, that is to say for erosion of the filter cake, a rinsing system is provided. The rinsing system comprises rinsing ports 46 which are arranged tangentially in the lower region 48 of the housing 12 and open out into the chamber for the heterogeneous mixture 20 of matter and introduce a washing medium, for example water, into the housing 12. The rinsing ports 46, by means of the tangential orientation, generate a circular flow in the lower region 48 of the housing 12 which supports the dissolution, rinsing and/or discharge process of the filter cake.

The rinsing system further comprises rinsing rings 50, 50', which are situated within the chamber for the heterogeneous mixture 20 of matter. The rinsing rings 50, 50' are designed in such a manner that, by spraying the filter candles 24 with a washing medium, for example water, the filter cake is mechanically eroded. In the embodiment shown in FIG. 1, two spray rings 50, 50' are provided with spray nozzles 52, wherein one spray ring 50 is situated above the filter candles 24 and a further spray ring 50' is introduced between the filter candles 24. The spray rings 50, 50' can be fastened in this case on the housing 12 or on the filter candles 24 by means of suitable holders.

In the embodiment shown in FIG. 1, the spray ring 50 above the filter candles 24 has a greater diameter than the spray ring 50' which is situated between the filter candles 24. The arrangement of the spray rings 50, 50' and the diameter thereof, however, can be adapted to any arrangement of filter candles 24, in such a manner that an optimum mechanical cleaning effect is achieved. The spray nozzles 52 of the spray rings 50, 50', in the embodiment shown in FIG. 1, are orientated in such a manner that the washing medium is sprayed downwards to the housing base 40. In general, the orientation of the spray nozzles 52 can be selected so as to be pivotable or, according to positioning and number of the spray rings 50, 50', selected in such a manner that an optimum cleaning effect is achieved.

FIG. 2, in a schematic representation, shows the device 10 according to the invention of FIG. 1 in plan view including spray rings 50, 50'. Through the feed 14 on the housing 12, the heterogeneous mixture of matter that is to be separated is introduced into the chamber for the heterogeneous mixture 20 of matter. The filter unit 22 which comprises a plurality of filter candles 24 that are fastened in the housing 12 is situated there. In the lower region 36, the filter candles 24 are mounted in a filter base 26 which, for example, has a number of holes 38 corresponding to the number of the filter candles 24.

In the upper region 28, the filter candles 24, owing to the length thereof, are further fixed by a holding system 30. The holding system 30 comprises sleeves 32 which enclose the individual filter candles 24 at the periphery. The filter candles 24 are thereby burdened in a planar manner and are therefore held in position in a gentle manner. In order that the cleaning effect of the rinsing system, in particular of the spray rings 50, 50', is not impaired, the holding system 30 is constructed so as to be open, by connecting the sleeves 32 to one another by means of webs 34. The sleeves 32 which are connected to one another by webs 34 are additionally fastened to the housing 12 by suitable means, for example further webs 34. Thus the holding system can be fixed, for example by means of further webs 34, to the shell surface 54 of the housing 12, the housing base 40, or the housing cover 44.

In addition, the device 10 is equipped with a rinsing system 46, 50, 50' which erodes the filter cake arising owing to the filtering action on the filter candles 24. The rinsing system 46, 50, 50' comprises rinsing ports 46 which are arranged tangentially on the shell surface 54 of the cylindrical housing 12. In the embodiment shown in FIG. 2, in total three rinsing ports 46 are arranged regularly on the cylindrical shell surface 54 of the housing 12. This design permits an improved rinsing process to be provided with increased dissolution and discharge capacities.

In general, the number and arrangement of the rinsing ports 46 can be adapted as desired to the desired cleaning effect. Thus, the rinsing ports 46 can be arranged in regular or irregular spacings on the cylindrical shell surface 54 of the housing 12.

In addition to the rinsing ports 46, the rinsing system 46, 50, 50' comprises spray rings 50, 50' having spray nozzles 52 which are situated in the chamber for the heterogeneous mixture 20 of matter. The spray rings 50, 50' with spray nozzles 52 mechanically erode the filter cake by spraying the filter candles 24 with a washing medium, for example water. In the embodiment shown here, the rinsing system 46, 50, 50' provides two spray rings 50, 50' with spray nozzles 52 which have different diameters. In this case the spray ring 50' having the smaller diameter is placed between the filter candles and the spray ring 50 having the larger diameter than spray ring 50' is situated above the filter candles 24.

In FIG. 3, an alternative embodiment of the rinsing ports 47 of the rinsing system 46, 47, 50, 50' is shown. The rinsing ports 47 are introduced orthogonally into the shell surface 54 of the housing 12 and comprise means for the tangential deflection of the stream of the first washing medium. The deflection means 58 of the embodiment shown in FIG. 3 are constructed as a tubular elongation 60 of the rinsing ports 47 which project into the chamber for the heterogeneous mixture of matter. Thus, in a simple manner, a circular stream is generated from a tangential stream of washing medium, which provides an improved rinsing process with increased dissolution and discharge capacities.

The embodiments shown in FIGS. 2 and 3 can also be used in combination, wherein the rinsing ports can be arranged regularly or irregularly on the cylindrical shell surface 54 of the housing 12.

FIG. 4 shows a detail view of the above described holding system 30, which comprises sleeves 32 that are connected to one another via webs 34, and fixes the filter candles 24 together with the filter base 26 within the housing 12. The sleeves 30 for this purpose have an internal circumference which substantially corresponds to the outer circumference of the filter candles 24. The sleeves can thereby enclose the filter candles 24 at the periphery. Between the individual sleeves 32 enclosing the filter candles 24, there are further provided webs 34 which connect the individual sleeves 32 to one another. The system of sleeves 32 and webs 34 thus constructed can be fastened by further webs 34 on the housing 12, for example the shell surface 54 of the housing 12, the housing base 40 or the housing cover 44. The webs 34 can be constructed as a web sheet metal which runs between the sleeves 32. In this manner an open holding system 30 can be provided which does not affect the cleaning action of the rinsing system 46, 50, 50', in particular of a spray ring 50 arranged above the filter candles 24.

FIG. 5, in a schematic representation, shows the device 10 according to the invention of FIG. 1 in plan view including spray arms 51, 51'. The embodiment of FIG. 5 essentially corresponds to the embodiment of FIG. 2. In contrast to FIG. 2 the spray nozzles are provided on spray arms 51, 51', which are fed by one connection 53. Furthermore, the arrangement of filter elements 24 in a honey comb structure 56 is illustrated.

EXAMPLES

Filter without the cleaning system according to the invention:

For filters with a cleaning system known in the art a cleaning period of about 2 hours is required including 10 m$^3$ of water. In order to reach the desired cleaning effect, the filter is opened and the candles are further sprayed using a hose assembly. This cleaning step takes about 1 hour and uses up about 1 of 10 m$^3$ water. This way the cleaning is overall time consuming and involves further danger, as the filter is cleaned with hot water.

Filter including the cleaning system according to the invention:

For filters with a cleaning system according to the invention comprising rinsing port arranged tangentially to the cylindrical shell and two spray rings at different heights a cleaning period of about 1 hour is required including 5 m$^3$ of water. Opening and closing of the system is not required. Thus the filter can be cleaned in a efficient way reaching the desired cleaning effect. In particular compared to the state of the art, the time and water consumption is drastically reduced.

LIST OF REFERENCE SIGNS 10 device for separating a heterogeneous mixture of matter
12 housing
14 feed
16 outlet
18 upper region of the housing
20 chamber for the heterogeneous mixture of matter
22 filter unit
24 filter candle
26 filter base
28 upper region of the filter candle
30 holding system 32 sleeve
34 web
36 lower region of the filter candle
38 hole in the filter base
40 housing base
42 venting opening
44 housing cover
46 rinsing port
47 rinsing port
48 lower region of the housing
50, 50' spray rings
51, 51' spray arms
52 spray nozzle
53 connection for spray arms
54 cylindrical shell surface
56 honey comb structure

We claim:
1. A filtration apparatus comprising:
a filter housing (12) having an inlet (14) and an outlet (16);
a filter base (26) within said housing dividing said housing into an unfiltered or retentate chamber (20) and a filtrate chamber (21), said base having a plurality of holes (38) extending therethrough;
a plurality of filter candles (24) corresponding in number to the number of holes (38) in said base (26), and sealingly extending from said holes into said unfiltered or retentate chamber (20);
an open holding system in said unfiltered or retentate section including:
a plurality of sleeves (32) corresponding in number and partially enclosing
each of said plurality of filter candles (24); and
one or more webs (34) connecting said sleeves (32) to each other and/or
said filter housing (12);
a rinsing system comprising a plurality of rinsing ports (47) which are arranged in the lower region (48) of the housing (12), said rinsing ports including a tubular elongation (60) opening into said unfiltered or retentate chamber, said tubular elongation being constructed and arranged to tangentially deflect a stream of a first washing medium out into said unfiltered or retentate chamber, tangentially at a housing shell surface (54).

* * * * *

UNITED STATES PATENT AND TRADEMARK OFFICE
CERTIFICATE OF CORRECTION

PATENT NO. : 9,782,703 B2
APPLICATION NO. : 13/630559
DATED : October 10, 2017
INVENTOR(S) : Stefan Wittmer et al.

It is certified that error appears in the above-identified patent and that said Letters Patent is hereby corrected as shown below:

In the Specification

Column 5, Line 44, "0.5 to 10 m3/h." should read -- 0.5 to 10 $m^3/h$ --.

Signed and Sealed this
Twenty-seventh Day of February, 2018

Andrei Iancu
*Director of the United States Patent and Trademark Office*